No. 746,893. PATENTED DEC. 15, 1903.
C. W. STANTON.
TRAP.
APPLICATION FILED NOV. 20, 1902.
NO MODEL.
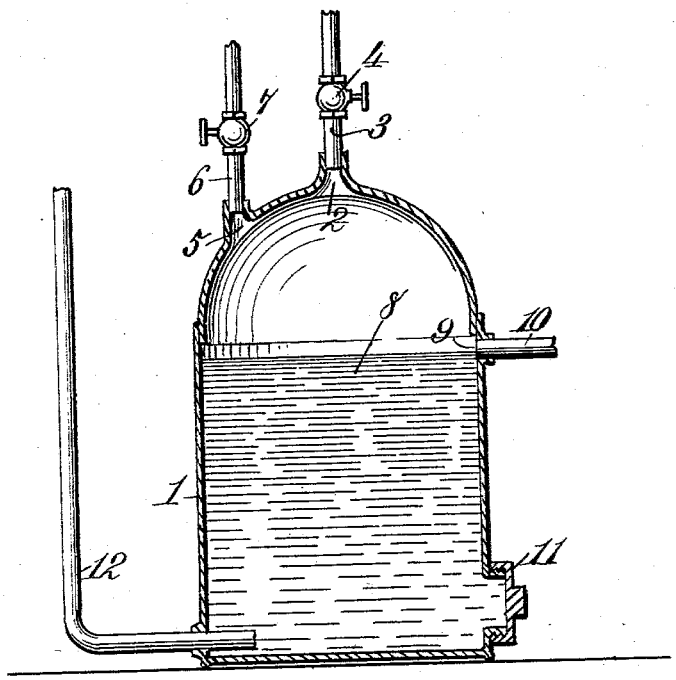
Witnesses,
Robert Everett,
F. R. Erney
Inventor,
Charles W. Stanton,
By James L. Norris
Atty.
THE NORRIS PETERS CO., PHOTO-LITHO., WASHINGTON, D. C.

No. 746,893.

Patented December 15, 1903.

UNITED STATES PATENT OFFICE.

CHARLES WALDREN STANTON, OF MOBILE, ALABAMA.

TRAP.

SPECIFICATION forming part of Letters Patent No. 746,893, dated December 15, 1903.

Application filed November 20, 1902. Serial No. 132,174. (No model.)

*To all whom it may concern:*

Be it known that I, CHARLES WALDREN STANTON, a citizen of the United States, residing at Mobile, in the county of Mobile and State of Alabama, have invented new and useful Improvements in Traps, of which the following is a specification.

This invention relates to certain new and useful improvements in traps for use in connection with retorts, stills, reducing-furnaces, and the like, and is adapted to prevent back atmospheric pressure and at the same time releasing the products of condensation, uncondensed gases, or other matters fed thereto.

The invention aims to provide a trap for the above purpose adapted for use in any form of an apparatus or structure for which it is applicable, and, further, aims to construct a trap which shall be simple in construction, durable, efficient in its use, and comparatively inexpensive to manufacture.

To this end the invention consists of the novel combination and arrangement of parts hereinafter more specifically described, illustrated in the accompanying drawing, and particularly pointed out in the claim hereunto appended.

In describing the invention in detail reference is had to the accompanying drawing, which is a sectional elevation of the trap.

Referring to the drawing by reference characters, the trap is constructed of a closed receptacle 1, formed of two sections, the lower of which is cylindrical in contour and having a closed bottom and an open top, and the upper of which is semispherical in contour and connected at its lower end to the top of the lower section. The semispherical-shaped section of the receptacle 1 is provided with an opening 2 in the top, communicating with a gas-take-off pipe 3, provided with a cut-off 4. The upper section of the receptacle is further formed with an opening 5, communicating with a filling-pipe 6, having a cut-off 7. The pipe 6 is used for filling the receptacle 1 with a suitable quantity of a liquid sealing medium 8. The lower section of the receptacle 1, near the top thereof, has an opening 9, communicating with an overflow-pipe 10, arranged above the level of the sealing medium 8. Below this pipe 10 the lower section of the receptacle 1 is further provided with an opening closed by means of a door or cover 11. The opening closed by the door or cover 11 when the latter is in its open position is adapted to permit of access being had to the receptacle, so it can be cleaned. Near the bottom of the lower section of the receptacle 1, opposite the door or cover 11, is the substantially L-shaped entrance or inlet pipe 12, which communicates with the interior of the trap and is adapted to feed to the trap the products of condensation, uncondensed gases, or other matters when the trap is in communication with an apparatus or other structure, or, rather, when the trap is connected up for use.

The trap operates as follows: The sealing medium 8 is supplied thereto and the entrance or inlet pipe 12 placed in communication with an apparatus or other structure as occasion requires. As the entrance or inlet pipe 12 extends into the sealing medium, it will be evident that the latter will prevent back atmospheric pressure to the apparatus or structure with which the trap is in communication. The products of condensation, uncondensed gases, or other matters as they enter the trap cause the sealing medium to overflow through the pipe 10 and the condensed products or other liquid matters assist in acting as a seal to prevent back atmospheric pressure. If all of the sealing medium 8 is discharged from the trap, the products of condensation or other liquid matters then act as a seal, these products or other liquid matters also overflowing when they reach a certain level. The overflow-pipe is arranged at such a distance above the entrance or inlet pipe 12 as to retain in the trap a suitable quantity of the sealing medium or products of condensation or other matters at all times in the trap. The gases or vapors which are supplied to the trap through the inlet or pipe 12 and which pass up through the seal in the trap exhaust themselves through the overflow-pipe 10, as well as through the take-off pipe 3, when the cock 4 is open.

From the foregoing construction of trap it will be evident that a permanent seal is formed therein to prevent back atmospheric pressure. The door or cover 11 when open will also permit of the discharge of the sealing medium or the products of condensation or other matters which do not overflow from the receptacle by means of the pipe 10.

It is thought the many advantages of a trap constructed in accordance with the foregoing description, taken in connection with the accompanying drawing, can be readily understood, and it will furthermore be evident that minor changes in the details of construction can be made without departing from the general spirit of the invention.

Having thus fully described my invention, what I claim as new, and desire to secure by Letters Patent, is—

In a trap, a receptacle formed of two sections the upper of which is semispherical in contour and the lower of which is cylindrical in contour, each of said sections provided with a pair of openings, a door for closing one of the openings of the lower section, an overflow-pipe communicating with the other opening in the lower section, a take-off pipe communicating with one of the openings of the upper section and provided with a cut-off, a filling-pipe communicating with the other opening of the upper section and provided with a cut-off, and an L-shaped inlet-pipe projecting in said lower section near the bottom thereof, said receptacle adapted to contain a liquid to form a seal, substantially as herein shown and described.

In testimony whereof I have hereunto set my hand in presence of two subscribing witnesses.

CHARLES WALDREN STANTON.

Witnesses:
GEO. W. REA,
WILLIS H. FOWLE.